Figures 1, 2:
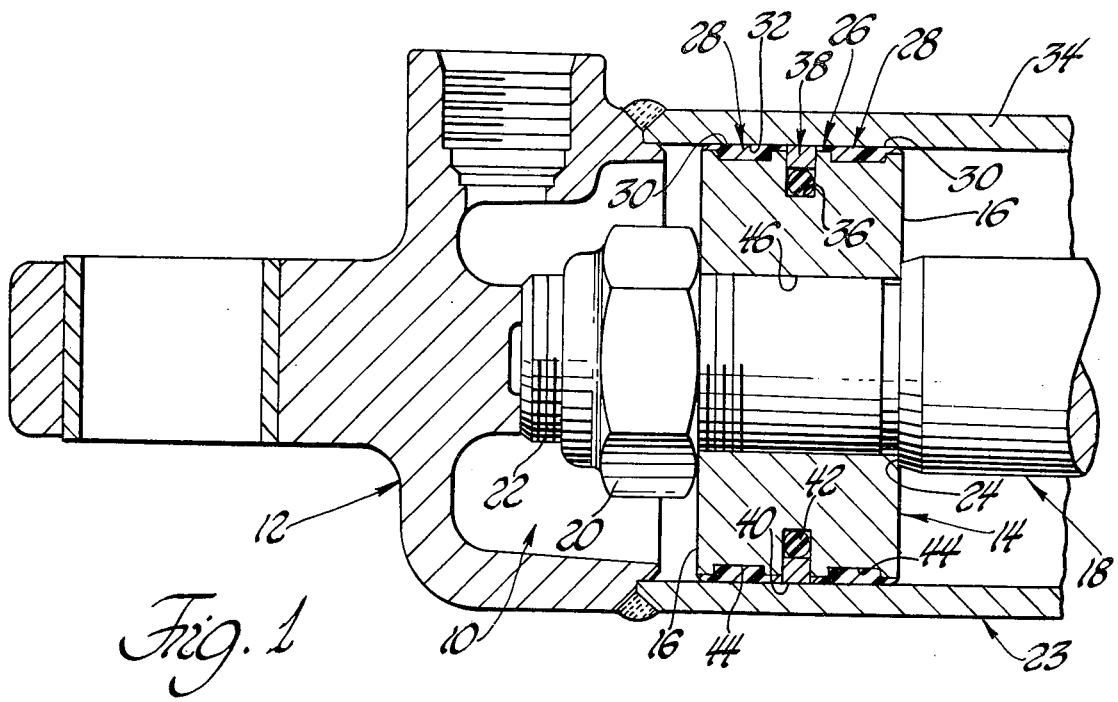

United States Patent [19]

Schumacher et al.

[11] 4,067,093
[45] Jan. 10, 1978

[54] PISTON ASSEMBLY AND METHOD FOR MANUFACTURING

[75] Inventors: Roger R. Schumacher, Birmingham, Mich.; William Olson, Elm Grove, Wis.

[73] Assignee: Dynamic Seals Incorporated, Troy, Mich.

[21] Appl. No.: 757,553

[22] Filed: Jan. 7, 1977

Related U.S. Application Data

[62] Division of Ser. No. 688,967, May 24, 1976, abandoned.

[51] Int. Cl.² .................... B23P 15/10; B23P 13/00
[52] U.S. Cl. .................. 29/156.5 R; 29/527.1; 264/274; 29/DIG. 26
[58] Field of Search ............... 29/156.5 R, 149.5 NM, 29/527.2, 527.1, DIG. 26; 92/193, 248, 249, 253; 264/274

[56] References Cited

U.S. PATENT DOCUMENTS

| 1,802,281 | 4/1931 | Shimer ................................ 92/249 |
| 2,342,775 | 2/1944 | Whitney et al. ..................... 92/253 |
| 2,782,801 | 2/1957 | Ludwig ............................... 92/249 |
| 3,212,411 | 10/1965 | Storms ................................ 92/248 |
| 3,358,349 | 12/1967 | Rosen ........................... 29/156.5 R |
| 3,373,479 | 3/1968 | Watt et al. ...................... 29/527.1 |
| 3,669,576 | 6/1972 | Little et al. ........................ 92/193 |
| 3,670,071 | 6/1972 | Walchle et al. ................... 264/274 |
| 3,730,305 | 5/1973 | Fouts .................................. 92/248 |
| 3,827,122 | 8/1974 | Douglas ........................ 29/527.1 |

FOREIGN PATENT DOCUMENTS

| 895,103 | 3/1972 | Canada ............................... 92/249 |
| 513,163 | 11/1930 | Germany ....................... 29/156.5 R |
| 698,346 | 10/1953 | United Kingdom ................ 92/248 |

*Primary Examiner*—C.W. Lanham
*Assistant Examiner*—Daniel C. Crane
*Attorney, Agent, or Firm*—McGlynn and Milton

[57] ABSTRACT

A piston and cylinder assembly and a method for manufacturing the piston assembly. The piston assembly includes a circular integral piston. A glass-filled plastic bearing material is disposed completely annularly about the piston and extends entirely between end faces of the piston. The plastic bearing material provides a bearing surface for sliding engagement with an inner surface of a cylinder of the cylinder assembly. An annular groove extends through the plastic bearing material and into the piston between the end faces. The piston includes a central bore which is concentric with the groove and the outer circumference of the plastic bearing material. The method for manufacturing the piston assembly includes the step of disposing the piston on a positioning pin which extends into the central bore and disposing the piston in an enclosed mold cavity which is defined by a mold. Thereafter, the space between the curved cylindrical surface of the piston and the mold cavity is filled with a fluid plastic bearing material. After the plastic bearing material is allowed to harden, the outer surface of the bearing material is machined relative to the central bore so that the outer surface of the plastic bearing material is concentric with the central bore. The annular groove is subsequently machined through the cylindrical outer surface of the plastic bearing material and into the metal piston for receiving a sealing assembly.

1 Claim, 2 Drawing Figures

U.S. Patent     Jan. 10, 1978     4,067,093

PISTON ASSEMBLY AND METHOD FOR MANUFACTURING

This application is a division of application Ser. No. 688,967, filed May 24, 1976, now abandoned.

BACKGROUND OF THE INVENTION

This invention relates to hydraulic piston assemblies and methods for manufacturing piston assemblies.

Piston assemblies are designed and manufactured to be slidably movable within a cylinder. Most piston assemblies include seal and wear rings which are disposed or snapped into annular grooves which are machined into the piston component. The seal ring or rings prevent the flow of a fluid, such as a hydraulic fluid, past the piston as the piston slides within the cylinder. The wear ring or rings carry the bearing loads of the piston.

The prior art piston assemblies typically include an integral steel piston to provide the requisite strength characteristics with bearing material disposed annularly about the piston. The bearing material must provide a given bearing surface for the particular environment in which the piston assemblies are utilized. The amount of bearing surface required determines the length of the piston which, in turn, determines the length of the cylinder to provide a given stroke, i.e., piston movement along the cylinder. Presently most bearing materials comprise a snap-in bearing ring or similar bearing arrangement requiring a length of piston sufficient to receive and lock the bearing material in position. In addition, the piston length must be sufficient to accommodate a seal assembly. A further problem is that when the piston components, including the bearing rings and seals, are assembled onto the steel piston it is difficult to maintain the desired tolerances whereby the components are all sufficiently concentric with a given or central axis of the piston assembly.

Typical prior art piston assemblies are illustrated in U.S. Pat. No. 1,802,281 granted to J. M. Shimmer on Apr. 21, 1931; U.S. Pat. No. 2,984,895 granted to C. F. Griffin, Jr. et al on May 23, 1961; and U.S. Pat. No. 3,463,058 granted to H. W. Rockwell on Aug. 26, 1969.

The patent to Shimmer discloses a piston member having a resilient sleeve stretched over the piston and mechanically retained in place by grooves. The problem with such an assembly is that the nature of the resilient sleeve itself prevents its outer surface from being concentric within the tolerances required for a precision hydraulic cylinder and piston assembly, i.e., since the sleeve is resilient, its outer surface is not stable or fixed.

The Griffin patent discloses a piston assembly having bearing material disposed thereabout in grooves and machined to provide a bearing surface; however, the nature of the assembly is such that the piston must be substantially longer in length than the extremities of the bearing material for accommodating and retaining the bearing material.

The Rockwell patent discloses a piston assembly having two components making up the piston and defining an annular groove for receiving bearing rings, between which is disposed a seal assembly. The problem with such an assembly is that the piston must be of substantially greater length than the bearing material and because of the number of components it is difficult to maintain the tolerances whereby all of the components are sufficiently concentric to a given axis of the piston.

The subject invention overcomes the problems of the prior art assemblies by providing a piston assembly wherein the piston may be of shorter length yet provide the requisite bearing surface and wherein the problem with concentric tolerances is overcome.

Such is attained by a piston assembly constructed in accordance with the instant invention to include an integral piston having end faces with a peripheral surface extending between the end faces and bearing means disposed completely annularly about the piston. The bearing means extends entirely between the end faces for providing a bearing surface adapted for sliding engagement with the inner surface of the cylinder. The piston assembly also comprises an annular groove extending through the bearing means and into the piston between the end faces thereof. The bearing means and the groove are substantially concentric to the central axis of the piston assembly.

The invention also includes a method for manufacturing such a piston assembly by applying a fluid bearing material to the curved cylindrical surface of the piston completely between the end faces thereof, allowing the fluid bearing material to harden, and machining the hardened bearing material completely between the end faces of the piston. In addition, the annular groove is machined through the bearing material and into the piston. The machining is accomplished by machining relative to an axis of the piston to attain the desired concentricity.

Other advantages of the present invention will be readily appreciated as the same becomes better understood by reference to the following detailed description when considered in connection with the accompanying drawings wherein:

FIG. 1 is a fragmentary cross-sectional view showing a piston assembly constructed in accordance with the instant invention and disposed within a cylinder; and FIG. 2 is a cross-sectional view of a piston of the piston assembly disposed within a mold after an injection molding material has been injected into the mold cavity between the mold and the piston.

A piston assembly constructed in accordance with the instant invention is generally indicated at 10 in FIG. 1.

FIG. 1 shows the piston assembly 10 slidably disposed within a cylinder assembly generally indicated at 12. The piston assembly 10 and the cylinder assembly 12 define a piston and cylinder assembly. The piston assembly 10 comprises an integral circular metal piston generally indicated at 14. The piston 14 is preferably made of a metal such as steel to give it the desired strength characteristics. The integral piston 14 has parallel end faces 16 at opposite ends of the piston 14. The piston 14 is disposed about a reduced portion of a piston rod generally indicated at 18 and held in position by a threaded nut 20. The threaded nut 20 is threadedly attached to the piston rod 18 at threads 22 of the piston rod 18. The nut 20 secures the piston 14 against a shoulder portion 24 of the piston rod 18 to thereby center the piston 16 within a cylinder generally indicated at 23 of the cylinder assembly 12.

The piston 14 has a circular peripheral surface generally indicated at 26 which extends between the end faces 16. In other words, a plane parallel to the end faces 16 and moving all the way through the piston 14 will define a circle along the peripheral surface 26 which the plane intersects. The peripheral surface 26 includes recesses and a groove, as will be described hereinafter.

The piston assembly 10 includes a bearing means such as a glass-filled plastic or nylon bearing material generally indicated at 28 disposed completely annularly about the piston 14 and over the peripheral surface 26. The bearing material 28 extends entirely between the end faces 16 for providing a bearing surface 30 which slidably engages the inner surface 32 of a cylinder wall 34 of the cylinder 23. The bearing material 28 is in continuous engagement with the peripheral surface 26 of the piston 64 and is one integral member annularly about the periphery, i.e., there are no breaks or discontinuities or voids in the bearing material 28 in a direction annularly about the periphery of the piston 14. Said another way, the bearing material 28 is in radial frictional engagement with the periphery of the piston 14 to prevent movement thereof relative to the piston 14. The piston assembly 10 includes an annular groove 36 which extends through the bearing material 28 and into the piston 14 between the end faces 16 of the piston 14. A sealing means or a seal ring generally indicated at 38, which comprises a nonmetallic elastic material such as Teflon, is disposed within the groove 36. The seal ring 38 has a sealing face or surface 40 which sealingly engages the inner surface 32 of the cylinder wall 34.

A resilient O-ring 42 is disposed within the groove 36 and radially between the groove 36 in the piston 14 and the seal ring 38. The piston 14 also includes recesses 44 which extend annularly about the periphery of the piston 14 on each side of the groove 36. The recesses 44 mechanically lock the bearing material 28 to the piston 14. The glass-reinforced plastic or nylon bearing material 28 is hard or rigid and, therefore, machinable or able to be reduced or finished by machine operated tools, as will be described in greater detail hereinafter.

The piston 14 includes a central bore 46 which is substantially concentric with both the groove 36 and the outer circumference or bearing surface 30 of the bearing material 28.

A method for manufacturing the piston assembly 10 will now be described in accordance with the instant invention.

Initially, the piston 14 is disposed on a positioning pin 48, the positioning pin 48 extending into the central bore 46 of the piston 14. The positioning pin 48 extends from a movable mold portion 50 and the piston 14 abuttingly engages the mold portion 50 at one end face 16. The mold portion 50, the pin 48 and the piston 14 are inserted or disposed in an enclosed mold cavity generally indicated at 52 which is defined within a mold generally indicated at 54. The piston 14 is positioned within the mold cavity 52 so no air spaces exist between the end faces 16 and the mold 54 nor between the mold portion 50 and the end face 16 against which the mold portion 50 abuts. The recesses 44 are formed in the piston 14 prior to its placement in the mold. The space of the mold cavity 52 between the curved cylindrical surface or peripheral surface 26 of the piston 14 and the mold 54 is filled with the plastic bearing material 28 in its fluid state through an injection molding bore 56 in a well known fashion. The plastic bearing material 28 is then allowed to harden and becomes rigid or hard and, thus, machinable. The bearing material 28 hardens into radial frictional or gripping engagement with the peripheral surface 26 of the piston 14 so as to prevent movement of the bearing material 28 relative to the piston 14. The movable mold portion 15 is then withdrawn from the mold cavity 52 carrying with it the positioning pin 48 and the plastic covered piston 14. The outer surface 30 of the bearing material is then machined to a close tolerance while on the same positioning pin 48 or a similar positioning means. The outer surface 30 of the bearing material 28 is machined relative to the central bore 46 so that the outer surface 30 of the bearing material 28 is concentric in the machining sense with the central bore 46. In other words, the outer surface 30 of the bearing material 28 can be machined so it is coaxial with the central bore 46 within the limits of the machining tools. Thereafter, the annular groove 36 is machined through the cylindrical outer surface 30 of the plastic bearing material 28 and into the metal piston 14 again using the positioning pin 28 during the machining step to locate the coated piston 14 relative to the machine operated tool. The groove 36 is machined to a very high tolerance and is concentric with the central bore 46 of the piston 14.

Because of the closer tolerances in the groove 36, which is machined into the piston 14, very high quality and close tolerance seals, such as the Teflon seal ring 38, may be utilized to more effectively seal the piston assembly 10 against the cylinder wall 34. Typically, the components of the prior art piston assemblies only provide, at best, concentricity tolerance of approximately twenty-five thousandths of an inch relative to the central axis of the piston. However, the subject invention reduces this clearance to between three to six thousandths of an inch as the bearing material 28 and the sealing groove 36 and both machined relative to the same axis, i.e., the central axis of the piston 14. Thus, the terms concentricity or concentric as used herein, means the very high tolerance of less than ten thousandths of an inch in concentricity. Because of the long bearing surface 30 provided by the bearing material 28, thd piston may be much shorter in length than the prior art piston assemblies thereby to provide a longer piston stroke and/or reduce the length of the cylinder 23 in which the piston assembly 10 slides. Furthermore, the piston 14 is shorter because no room is needed to snap in bearing and/or wear rings.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method for manufacturing a piston assembly including a cylindrical metal piston having end faces and a circular peripheral surface extending between the end faces and a central bore therethrough, the piston being adapted for sliding movement within a cylinder, the method comprising; disposing the piston on positioning means engaging the central bore and in an enclosed mold cavity defined within a mold with the cavity extending completely about the circular peripheral surface and between the end faces thereof, filling the space between the circular peripheral surface of the piston and the enclosed mold cavity between the end faces of the piston with a fluid plastic bearing material so that the outer circular peripheral surface of the piston is completely covered between the end faces of the piston with the bearing material, allowing the fluid plastic bearing material to harden, machining the outer surface of the plastic bearing material relative to the central bore so that the outer surface thereof is concentric with the central bore, and thereafter machining an annular groove through the outer surface of the plastic bearing material and into the metal piston.

* * * * *